US011545676B2

(12) United States Patent
Piesker

(10) Patent No.: US 11,545,676 B2
(45) Date of Patent: Jan. 3, 2023

(54) COOLING AND GAS DEHUMIDIFYING SYSTEM, TRANSPORT MEANS, AND METHOD FOR OPERATING A COOLING AND GAS DEHUMIDIFYING SYSTEM

(71) Applicant: Airbus Operations GmbH, Hamburg (DE)

(72) Inventor: Markus Piesker, Hamburg (DE)

(73) Assignee: AIRBUS OPERATIONS GMBH, Hamburg (DE)

(*) Notice: Subject to any disclaimer, the term of this patent is extended or adjusted under 35 U.S.C. 154(b) by 562 days.

(21) Appl. No.: 16/682,574

(22) Filed: Nov. 13, 2019

(65) Prior Publication Data

US 2020/0156800 A1 May 21, 2020

(30) Foreign Application Priority Data

Nov. 15, 2018 (DE) .................... 102018128715.1

(51) Int. Cl.
*H01M 8/04* (2016.01)
*H01M 8/04007* (2016.01)
(Continued)

(52) U.S. Cl.
CPC ...... *H01M 8/04007* (2013.01); *B01D 5/0075* (2013.01); *B64D 15/04* (2013.01);
(Continued)

(58) Field of Classification Search
CPC .................... H01M 8/04007; B01D 5/0075
(Continued)

(56) References Cited

U.S. PATENT DOCUMENTS

2004/0028966 A1 2/2004 Hibbs et al.
2006/0099471 A1 5/2006 Ichikawa et al.
(Continued)

FOREIGN PATENT DOCUMENTS

DE 102008060533 A1 6/2010
DE 102012008494 A1 10/2013
EP 2289802 A2 3/2011

OTHER PUBLICATIONS

European Search Report from corresponding European Patent Application No. 19204761.1 dated Apr. 24, 2020.
German Search Report; priority document.

*Primary Examiner* — James M Erwin
(74) *Attorney, Agent, or Firm* — Greer, Burns & Crain, Ltd.

(57) ABSTRACT

A cooling and gas dehumidifying system comprising a cooling circuit in which a thermal fluid is circulated. The system further comprises a cooling arrangement arranged in the cooling circuit and configured to cool the thermal fluid flowing therethrough. A consumer gives up heat energy to the thermal fluid flowing through the cooling circuit. A gas dehumidifier having a heat exchanger arrangement is configured to be thermally coupled in a gas dehumidifying operating state with the thermal fluid flowing through the cooling circuit downstream of the cooling arrangement and having a first temperature, and thereby give up heat energy to the thermal fluid, and to be thermally coupled in a de-icing operating state with the thermal fluid flowing through the cooling circuit downstream of the consumer and having a second temperature, and thereby absorb heat energy from the thermal fluid, the second temperature being higher than the first temperature.

14 Claims, 5 Drawing Sheets

(51) Int. Cl.
  *B64D 15/04* (2006.01)
  *H01M 8/04701* (2016.01)
  *H01M 8/18* (2006.01)
  *B01D 5/00* (2006.01)

(52) U.S. Cl.
  CPC ... *H01M 8/04723* (2013.01); *H01M 8/04738* (2013.01); *H01M 8/186* (2013.01)

(58) Field of Classification Search
  USPC .......................................................... 62/241
  See application file for complete search history.

(56) References Cited

U.S. PATENT DOCUMENTS

| | | | |
|---|---|---|---|
| 2008/0001026 A1 | 1/2008 | Hoffjann et al. | |
| 2012/0261512 A1 | 10/2012 | Stolet et al. | |
| 2014/0349214 A1* | 11/2014 | Oehme | F25B 9/04 |
| | | | 429/513 |

* cited by examiner

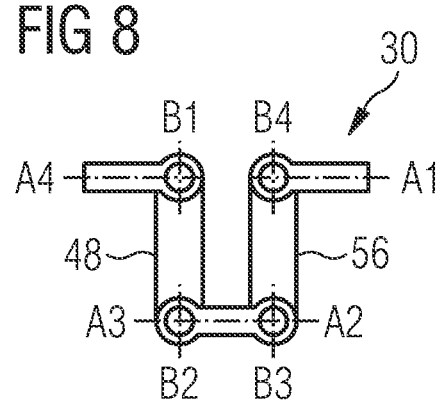
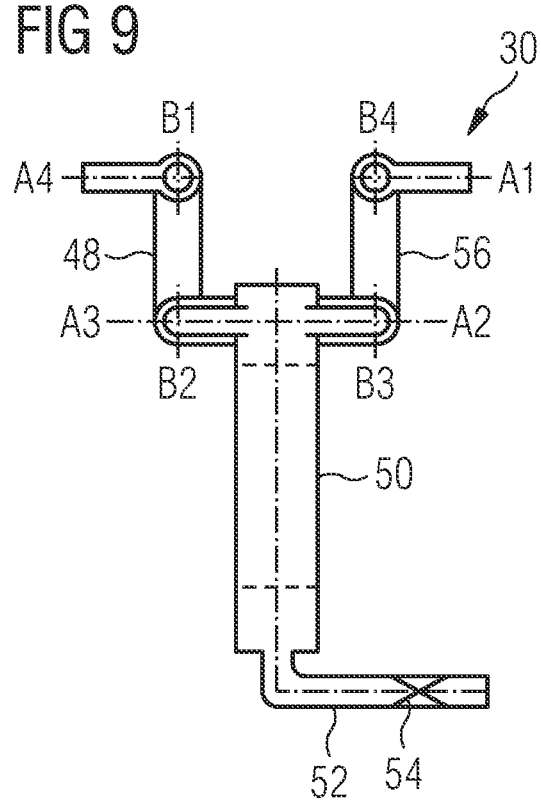
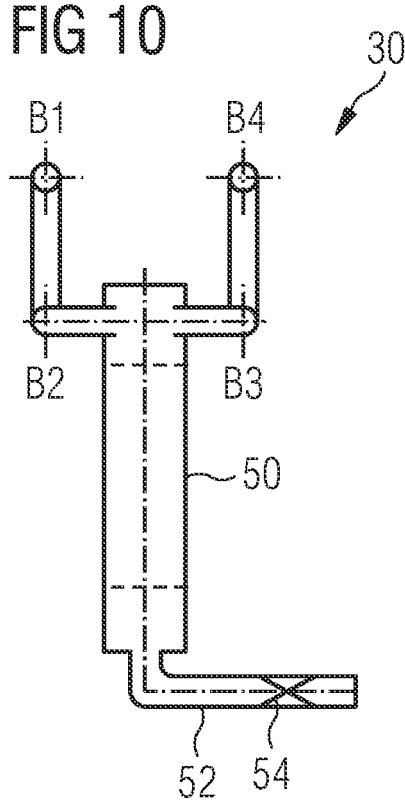

COOLING AND GAS DEHUMIDIFYING SYSTEM, TRANSPORT MEANS, AND METHOD FOR OPERATING A COOLING AND GAS DEHUMIDIFYING SYSTEM

CROSS-REFERENCES TO RELATED APPLICATIONS

This application claims the benefit of the German patent application No. 102018128715.1 filed on Nov. 15, 2018, the entire disclosures of which are incorporated herein by way of reference.

FIELD OF THE INVENTION

The invention relates to a cooling and gas dehumidifying system which is capable of cooling a consumer and supplying it with dry gas. The invention relates further to a transport means equipped with such a cooling and gas dehumidifying system, and to a method for operating such a cooling and gas dehumidifying system.

BACKGROUND OF THE INVENTION

In regenerative fuel cell systems, a fuel cell serves to convert hydrogen and oxygen into water and thereby generate electric current. An electrolyzer located downstream of the fuel cell splits the water produced by the fuel cell into the gases hydrogen and oxygen again. These gases are then fed back into the fuel cell, where they are again used to generate current. During operation, the fuel cell and the electrolyzer must be cooled. Therefore, in a regenerative fuel cell system, the fuel cell and the electrolyzer are arranged in a cooling circuit in which a thermal fluid is circulated. As the thermal fluid flows through the fuel cell and the electrolyzer, it absorbs heat energy. Cooling of the thermal fluid takes place in a cooling arrangement arranged in the cooling circuit.

In order to achieve high efficiency of the fuel cell, the gases fed to the fuel cell must have a particularly high degree of dryness, that is to say a very low water content (ideally a water content equal to zero). Therefore, regenerative fuel cells are conventionally equipped with a gas dehumidifier which serves to dehumidify the gases used for current generation in the fuel cell before they are fed into the fuel cell. When gases are dried or dehumidified, the temperature of the gas is lowered so that it falls below the dew point of water. The water contained in the gas can thereby be deposited as condensation water. The further the temperature is lowered, the dryer the gas becomes. Cooling of the gas is conventionally carried out by means of a corresponding heat exchanger which extracts heat energy from the gas.

A particularly high degree of dryness is achieved when the gas to be dried is cooled in the gas dehumidifier to below the freezing point of water. However, this has the result that the water that has condensed out freezes in the heat exchanger, for example on a cold wall of the heat exchanger or in the form of ice crystals which are precipitated from the gas. However, the deposition of ice crystals in the heat exchanger results in increasing narrowing of the flow cross section of the heat exchanger. Furthermore, the layers of ice growing on the walls of the heat exchanger increasingly reduce the performance of the heat exchanger. It is therefore necessary when operating a gas dehumidifier to regularly de-ice the heat exchanger of the gas dehumidifier. In most cases, this is carried out by heating the heat exchanger. For example, a cooling air stream can be replaced by a hot air stream which heats the wall of the heat exchanger on which a layer of ice has formed, so that the ice is melted.

SUMMARY OF THE INVENTION

Accordingly, an object underlying the invention is to provide a cooling and gas dehumidifying system which is capable of cooling a consumer and supplying it with dry gas and which can be operated particularly efficiently. The invention is further directed at an object of providing a transport means equipped with such a cooling and gas dehumidifying system and a method for operating such a cooling and gas dehumidifying system.

A cooling and gas dehumidifying system which is suitable for use in a transport means comprises a cooling circuit in which a thermal fluid is circulated. The transport means is preferably an aircraft. The thermal fluid circulating in the cooling circuit can be liquid or gaseous. For conveying the thermal fluid through the cooling circuit, a conveying device in the form of, for example, a pump or a fan can be arranged in the cooling circuit.

A cooling arrangement arranged in the cooling circuit is adapted to cool the thermal fluid flowing through the cooling circuit. The cooling arrangement can comprise, for example, a heat exchanger which is adapted thermally to couple the thermal fluid flowing through the cooling circuit with cold external air guided through the heat exchanger. The heat exchanger can be arranged, for example, in a ram air channel through which cold external air can be guided by correspondingly controlling the position of a ram air channel valve. The cold external air, which in flying operation of an aircraft equipped with the cooling and gas dehumidifying system can have a temperature of below −30° C., then serves as a heat sink for the heat to be dissipated from the thermal fluid as it flows through the cooling arrangement Immediately downstream of the cooling arrangement, the thermal fluid circulating in the cooling circuit can have a temperature of, for example, about −15° C. The terms "downstream" and "upstream" here relate to the direction of flow of the thermal fluid through the cooling circuit.

The cooling and gas dehumidifying system further comprises a consumer which is adapted to give up heat energy to the thermal fluid flowing through the cooling circuit. For this purpose, a thermal coupling between the consumer and the thermal fluid flowing through the cooling circuit is preferably provided. Downstream of the thermal coupling with the consumer, the thermal fluid consequently has a higher temperature than it has upstream of the thermal coupling with the consumer. For example, the temperature of the thermal fluid flowing through the cooling circuit downstream of the consumer can be about +80° C. The consumer can comprise a fuel cell which, during operation, produces water from hydrogen and oxygen and thereby releases electrical energy. The consumer can further comprise an electrolyzer located downstream of the fuel cell, which electrolyzer electrolytically decomposes the water produced by the fuel cell into the gases hydrogen and oxygen again.

Finally, the cooling and gas dehumidifying system comprises a gas dehumidifier having a heat exchanger arrangement. The heat exchanger arrangement is adapted to be thermally coupled in a gas dehumidifying operating state with the thermal fluid flowing through the cooling circuit downstream of the cooling arrangement and having a first temperature and thereby give up heat energy to the thermal fluid. In its gas dehumidifying operating state, at least one gas to be dehumidified further flows through the heat exchanger arrangement of the gas dehumidifier. For example, hydrogen and/or oxygen to be fed to a fuel cell of the consumer can flow through the heat exchanger arrangement in its gas dehumidifying operating state. As it flows through the heat exchanger arrangement, the gas to be dehumidified is cooled to below the dew point of water, so that the water contained in the gas can be deposited as condensation water. The heat given off in this process by the gas to be dehumidified is transmitted to the thermal fluid circulating in the cooling circuit.

Since the gas dehumidification in the heat exchanger arrangement of the gas dehumidifier is all the more effective, the lower the temperature to which the gas to be dehumidified flowing through the heat exchanger arrangement is cooled, it is advantageous if the thermal fluid, which absorbs the heat given off by the gas to be dehumidified as it dries, has as low a temperature as possible. Therefore, the heat exchanger arrangement of the gas dehumidifier in its gas dehumidifying operating state is preferably thermally coupled immediately downstream of the cooling arrangement with the thermal fluid circulating in the cooling circuit, wherein "immediately downstream" in this context means that, between the cooling arrangement and the heat exchanger arrangement of the gas dehumidifier, no components that give up heat to the thermal fluid are coupled with the cooling circuit. For example, the thermal fluid, when thermally coupled with the heat exchanger arrangement of the gas dehumidifier in the gas dehumidifying operating state thereof, can have a first temperature of about −15° C. At this temperature of the thermal fluid, effective drying of the gas flowing through the heat exchanger arrangement takes place. However, cooling of the gas flowing through the heat exchanger arrangement to a temperature below the freezing point of water leads to the formation of ice in the heat exchanger arrangement.

For this reason, the heat exchanger arrangement of the gas dehumidifier is further adapted to be thermally coupled in a de-icing operating state with the thermal fluid flowing through the cooling circuit downstream of the consumer and having a second temperature, and thereby absorb heat energy from the thermal fluid. The second temperature is higher than the first temperature. In other words, in its de-icing operating state, the heat exchanger arrangement of the gas dehumidifier is heated by the thermal fluid circulating in the cooling circuit and thereby de-iced. When thermally coupled with the heat exchanger arrangement of the gas dehumidifier in the de-icing operating state thereof, the thermal fluid preferably has a second temperature above the freezing point of water, in order to ensure effective de-icing of the heat exchanger arrangement.

Particularly effective and efficient de-icing of the heat exchanger arrangement is possible when the heat exchanger arrangement of the gas dehumidifier in its de-icing operating state is thermally coupled immediately downstream of the consumer with the thermal fluid circulating in the cooling circuit, wherein "immediately downstream" in this context means that, between the consumer and the heat exchanger arrangement, no components that absorb heat from the thermal fluid and thereby cool the thermal fluid are coupled with the cooling circuit. For example, the thermal fluid, when thermally coupled with the heat exchanger arrangement of the gas dehumidifier in the de-icing operating state thereof, can have a second temperature of about +80° C. Rapid de-icing of the heat exchanger arrangement is thereby made possible. Furthermore, icing up of the heat exchanger arrangement can be slowed down if an ethylene glycol-water mixture or a propylene glycol-water mixture, for example, is used as the thermal fluid in the cooling and gas dehumidifying system instead of pure water.

Consequently, during operation of the cooling and gas dehumidifying system, the thermal fluid flowing through the cooling circuit is used both for cooling and for heating the heat exchanger arrangement of the gas dehumidifier. This is made possible by thermally coupling the heat exchanger arrangement of the gas dehumidifier with different regions of the cooling circuit depending on its operating state, so that the heat exchanger arrangement is provided with either very cold or warm thermal fluid as a heat sink or as a heat source, depending on its operating state. The cooling and gas dehumidifying system can consequently be operated very efficiently and, moreover, is distinguished by a small number of individual components and consequently a small installation space requirement.

In a preferred embodiment, the cooling and gas dehumidifying system comprises a first control valve which is adapted to feed the thermal fluid which is flowing through the cooling circuit downstream of the consumer and which is consequently warm to the heat exchanger arrangement of the gas dehumidifier and/or to a storage container. For example, the first control valve can connect a first portion of the cooling circuit extending downstream of the consumer to a second portion of the cooling circuit leading in the direction towards the heat exchanger arrangement, when the heat exchanger arrangement is in its de-icing operating state and is to be heated by the warm thermal fluid flowing through the cooling circuit downstream of the consumer. When the heat exchanger arrangement of the gas dehumidifier is in its gas dehumidifying operating state, on the other hand, the first control valve can serve to separate the first portion of the cooling circuit from the second portion of the cooling circuit and instead connect the first portion of the cooling circuit to a third portion of the cooling circuit leading in the direction towards the storage container. If desired, the first control valve can also be adapted to perform variable flow control. For example, the first control valve can be so configured that it guides the thermal fluid flowing through the first portion of the cooling circuit in part into the second and in part into the third portion of the cooling circuit.

The cooling and gas dehumidifying system can further comprise a second control valve which is adapted to feed the thermal fluid which is flowing through the cooling circuit downstream of the cooling arrangement and which is consequently cold to the heat exchanger arrangement of the gas dehumidifier and/or to the storage container. For example, the second control valve can connect a fourth portion of the cooling circuit extending downstream of the cooling arrangement to a fifth portion of the cooling circuit leading in the direction towards the heat exchanger arrangement of the gas dehumidifier, when the heat exchanger arrangement is in its gas dehumidifying operating state and is to be cooled by the cold thermal fluid flowing through the cooling circuit downstream of the cooling arrangement. When the heat exchanger arrangement is in its de-icing operating state, on the other hand, the second control valve can serve to separate the fourth portion of the cooling circuit from the fifth portion of the cooling circuit and instead connect the fourth portion of the cooling circuit to a sixth portion of the cooling circuit leading in the direction towards the storage container. If desired, the second control valve can also be adapted to perform variable flow control. For example, the second control valve can be so configured that it guides the thermal fluid flowing through the fourth portion of the cooling circuit in part into the fifth and in part into the sixth portion of the cooling circuit.

The first and the second control valve can be configured separately from one another. Alternatively, however, it is also conceivable to equip the cooling and gas dehumidifying system with a single valve arrangement which performs the functions both of the first and of the second control valve.

In principle, it is conceivable to connect the third portion of the cooling circuit to a first storage container and the sixth portion of the cooling circuit to a second storage container. Preferably, however, the first and the second control valve are adapted to feed the thermal fluid flowing through the cooling circuit downstream of the consumer and the thermal fluid flowing through the cooling circuit downstream of the cooling arrangement to the same storage container. For example, the third and the sixth portion of the cooling circuit can lead into the same storage container. The thermal fluid heated by heat transfer from the consumer is then mixed in the storage container with the thermal fluid cooled by the cooling arrangement.

The storage container can further be arranged in the cooling circuit downstream of the heat exchanger arrangement of the gas dehumidifier. In particular, the storage container can be connected to a seventh portion of the cooling circuit extending downstream of the heat exchanger arrangement, so that thermal fluid which in the gas dehumidifying operating state of the heat exchanger arrangement absorbs heat from the gas to be dehumidified and is thereby heated can be guided into the storage container. This thermal fluid can then be mixed in the storage container with the warm thermal fluid from the third portion of the cooling circuit and/or the cold thermal fluid from the sixth portion of the cooling circuit.

A heating device can be arranged in the cooling circuit upstream of the consumer. The heating device is preferably adapted to heat the thermal fluid flowing through the cooling circuit before it is thermally coupled with the consumer. The arrangement of a heating device in the cooling circuit is expedient when the thermal fluid flowing through the cooling circuit is to be used for cooling the consumer but the thermal fluid, when thermally coupled with the consumer, is to be significantly warmer than when thermally coupled with the heat exchanger arrangement of the gas dehumidifier. When the consumer comprises a fuel cell which is to be cooled by the thermal fluid flowing through the cooling circuit, the temperature of the thermal fluid before it is thermally coupled with the consumer is preferably 75° C.

The heating device is preferably arranged in the cooling circuit downstream of the storage container. With such a configuration, the heating device only has to be operated when the temperature of the thermal fluid that is suitable for thermal coupling with the consumer is not established in the storage container in which warm thermal fluid from the third portion of the cooling circuit, cold thermal fluid from the sixth portion of the cooling circuit and/or thermal fluid from the seventh portion of the cooling circuit is mixed. This can be the case, for example, when the heat exchanger arrangement of the gas dehumidifier is in its de-icing operating state and consequently no warm thermal fluid from the third portion of the cooling circuit but instead cold thermal fluid from the sixth portion of the cooling circuit is guided into the storage container. The conveying device for conveying the thermal fluid through the cooling circuit can be arranged in the cooling circuit between the storage container and the heating device.

In a preferred embodiment of the cooling and gas dehumidifying system, the cooling circuit comprises a first circuit branch which is thermally coupled with the consumer. The cooling circuit can further comprise a second circuit branch which runs parallel to the first circuit branch and is thermally coupled with the cooling arrangement. Accordingly, a branching point can be provided in the cooling circuit upstream of the consumer and the cooling arrangement, at which branching point the cooling circuit branches into the first and the second circuit branch. This branching point can be arranged in the cooling circuit downstream of the heating device, for example.

The cooling and gas dehumidifying system can further comprise a flow control device which is adapted to guide a first partial volume flow of the thermal fluid flowing through the cooling circuit into the first circuit branch and a second partial volume flow of the thermal fluid flowing through the cooling circuit into the second circuit branch. The flow control device is preferably arranged in the region of the branching point at which the cooling circuit branches into the first and the second circuit branch. For example, the flow control device can comprise a hydraulic resistor which serves to correspondingly divide the thermal fluid flowing through the cooling circuit upstream of the branching point into the first partial volume flow and the second partial volume flow. The first partial volume flow is preferably larger than the second partial volume flow. Accordingly, a larger volume flow of the thermal fluid is preferably fed to the consumer than is fed to the cooling arrangement.

The heat exchanger arrangement of the gas dehumidifier is preferably adapted to change from its gas dehumidifying operating state into its de-icing operating state when a pressure loss in a gas flow for dehumidification flowing through the heat exchanger arrangement, which pressure loss is caused by iced-up flow channels in the heat exchanger arrangement, exceeds a threshold value. The heat exchanger arrangement can further be adapted to initiate the de-icing operating state when a temperature of the gas flow for dehumidification flowing through the heat exchanger arrangement exceeds a threshold value on leaving the heat exchanger arrangement as a result of a reduction in the heat exchange between the gas for dehumidification and the thermal fluid caused by a layer of ice in the heat exchanger arrangement.

In addition or alternatively, it is conceivable that the heat exchanger arrangement is adapted to change from its gas dehumidifying operating state into its de-icing operating state when a moisture content of the gas flow for dehumidification flowing through the heat exchanger arrangement exceeds a threshold value on leaving the heat exchanger arrangement. A diminishing drying quality in the gas dehumidifier as a result of icing-up of the heat exchanger arrangement is thus counteracted. The heat exchanger arrangement can further be adapted to initiate the de-icing operating state when a mass or volume flow of the gas flow for dehumidification flowing through the heat exchanger arrangement is below a threshold value on leaving the heat exchanger arrangement as a result of icing-up of the flow channels in the heat exchanger arrangement. A further parameter which the heat exchanger arrangement can use to change from its gas dehumidifying operating state into its de-icing operating state is the elapse of a time period.

The heat exchanger arrangement can use only one of the above-mentioned parameters for controlling its operating state. Alternatively, however, parameter combinations can also be used to cause the heat exchanger arrangement to initiate a change in its operating state. For controlling the operating state of the heat exchanger arrangement, the gas dehumidifier can comprise a control unit which in particular is adapted to correspondingly control the first and the second control valve of the cooling and gas dehumidifying system. For one or more of the above-mentioned parameters, corresponding curves can be stored in a memory of the control unit, which curves provide information about the icing-up of the flow channels in the heat exchanger arrangement.

The gas dehumidifier of the cooling and gas dehumidifying system preferably comprises a gas line through which the gas to be dehumidified in the gas dehumidifier can flow. The gas line accordingly serves to guide the gas to be dried on a specific flow path through the gas dehumidifier. A first heat exchanger of the heat exchanger arrangement can be arranged in the gas line. When the heat exchanger arrangement of the gas dehumidifier comprises only one heat exchanger, the first heat exchanger is thermally coupled in its gas dehumidifying operating state with the thermal fluid flowing through the cooling circuit downstream of the cooling arrangement and having the first temperature, so that the gas in the gas line is cooled as it flows through the first heat exchanger and thereby dried.

By contrast, the first heat exchanger in its de-icing operating state is thermally coupled with the thermal fluid flowing through the cooling circuit downstream of the consumer and having the second temperature. The gas in the gas line is then not cooled as it flows through the first heat exchanger and also not dried. However, if the de-icing operating state of the first heat exchanger is only short, for example lasts a few seconds, the dehumidifying performance of the gas dehumidifier is not unduly impaired thereby. If a particularly high dehumidifying quality of the gas dehumidifier is required, it is also possible to interrupt the supply of the gas to be dried to the gas dehumidifier, as long as the heat exchanger is in its de-icing operating state. This can be effected by correspondingly controlling a valve arranged in the gas line, for example by the control unit of the gas dehumidifier.

The gas dehumidifier can further comprise a water collector which is adapted to receive water coming from the first heat exchanger. In the gas dehumidifying operating state of the first heat exchanger, condensation water coming from the first heat exchanger can be collected in the water collector. Defrost water which comes from the first heat exchanger in the de-icing operating state of the first heat exchanger can further be guided into the water collector. The water collector can be arranged in the gas line.

In a variant of the gas dehumidifier, the water collector and the first heat exchanger are so arranged relative to one another that the water coming from the first heat exchanger flows into the water collector by gravity. A separate conveying device for conveying the water from the first heat exchanger into the water collector is then not required. In addition or alternatively, the water collector can be thermally coupled at least temporarily with the thermal fluid flowing through the cooling circuit downstream of the consumer and having the second temperature. The water collector is then heated by the warm thermal fluid and thereby protected against icing up.

The gas dehumidifier can further comprise a water outlet line connected to the water collector. A third control valve can be arranged in the water outlet line, which valve is adapted to control the discharge of water from the water collector. In particular, the third control valve can be adapted to free the water outlet line when a water level in the water collector exceeds a first threshold value and to shut off the water outlet line again before the water level in the water collector falls below a second threshold value, wherein the second threshold value is smaller than the first threshold value. With such an operation of the third control valve, a residual amount of water always remains in the water collector. It is thereby ensured that only water and not gas is always discharged from the water collector via the water outlet line.

For example, the third control valve can be adapted to free the water outlet line when a first sensor indicates that the water level in the water collector exceeds the first threshold value. The first threshold value can be, for example, a maximum water level of the water collector. The third control valve can further be adapted to shut off the water outlet line again when a second sensor indicates that the water level in the water collector has reached the second threshold value. The second threshold value can be, for example, a minimum water level of the water collector. Alternatively or in addition, it is also possible, however, that the third control valve is adapted to open the water outlet line and/or shut it off again after a defined time period has elapsed and/or in dependence on a pressure difference between the water collector and an outlet of the water outlet line. Finally, the operating state of the third control valve can also be controlled using at least one of the parameters that are also used for controlling the operating state of the heat exchanger of the gas dehumidifier.

Operation of the third control valve can be controlled, for example, by the control unit of the gas dehumidifier. Curves required for controlling the operation of the third control valve, for example a curve relating to the pressure difference between the water collector and an outlet of the water outlet line, can be stored in the memory of the control unit.

The third control valve can be a valve having a variable flow cross section. The third control valve is then adapted to control the flow of water through the water outlet line as desired. In addition or alternatively, there can be installed in the water outlet line a flow resistor, a nozzle, a diaphragm or a similar flow control element which permits only a defined flow volume, limits the flow and consequently lengthens the emptying operation of the water collector, or brings inertia into the system. Inaccuracies in the switching cycles of the third control valve can thereby be compensated.

The gas dehumidifier can further comprise a second heat exchanger. The first and the second heat exchanger of the gas dehumidifier can be arranged one behind the other in the gas line of the gas dehumidifier. The first and the second heat exchanger can further be adapted to be switched alternately between their de-icing operating state and their gas dehumidifying operating state. In other words, the first heat exchanger of the gas dehumidifier is preferably thermally coupled with the thermal fluid flowing through the cooling circuit downstream of the cooling arrangement and having the first temperature, while the second heat exchanger of the gas dehumidifier is thermally coupled with the thermal fluid flowing through the cooling circuit downstream of the consumer and having the second temperature, and is thereby de-iced. Conversely, the second heat exchanger of the gas dehumidifier is preferably thermally coupled with the thermal fluid flowing through the cooling circuit downstream of the cooling arrangement and having the first temperature, while the first heat exchanger of the gas dehumidifier is thermally coupled with the thermal fluid flowing through the cooling circuit downstream of the consumer and having the second temperature, and is thereby de-iced. Continuous operation of the gas dehumidifier is thereby made possible.

The water collector of the gas dehumidifier can be adapted to receive water coming from the second heat exchanger. In other words, the gas dehumidifier can be equipped with only one water collector which receives water from the first and the second heat exchanger. The water collector and the second heat exchanger are preferably so arranged relative to one another that the water coming from the second heat exchanger flows into the water collector by gravity.

The water collector can be arranged in the gas line of the gas dehumidifier between the first and the second heat exchanger. The gas to be dehumidified in the gas dehumidifier then flows in succession through the first heat exchanger, the water collector and the second heat exchanger. When the first heat exchanger is in its de-icing operating state, although the gas to be dried is first guided through the first heat exchanger, it is not dried thereby. The gas is cooled and consequently dried only when it flows through the second heat exchanger in its gas dehumidifying operating state. By contrast, the gas to be dried is already dried in the first heat exchanger when the first heat exchanger is in its gas dehumidifying operating state. When the second heat exchanger is, then, in its de-icing operating state, the gas absorbs some moisture again as it flows through the second heat exchanger. However, because the dwell time of the gas in the second heat exchanger is short, the drying quality is not unduly impaired. A gas dehumidifier in such a form has relatively few components and consequently a compact form.

The gas dehumidifier can further comprise a bypass line which branches from the gas line between the first and the second heat exchanger. In particular, the bypass line can branch from the gas line between the first heat exchanger and the water collector. The bypass line is preferably connected to the outlet of the gas line. Furthermore, a fourth control valve can be provided in the gas dehumidifier, which valve is adapted to guide a gas flow flowing through the gas line, after it has flowed through the first heat exchanger, into the bypass line when the first heat exchanger is in its gas dehumidifying operating state. Gas dried in the first heat exchanger can then be fed directly to the outlet of the gas line after flowing through the first heat exchanger. The gas is thereby prevented from absorbing moisture again when it flows through the second heat exchanger in its de-icing operating state.

The fourth control valve is preferably further adapted to guide the gas flow flowing through the gas line, after it has flowed through the first heat exchanger, into the second heat exchanger when the first heat exchanger is in its de-icing operating state. The gas flowing through the gas line is then dried as it flows through second heat exchanger in its gas dehumidifying operating state. A gas dehumidifier configured in this way provides a particularly high drying quality.

The first and/or the second heat exchanger of the heat exchanger arrangement can be in the form of a double-pipe heat exchanger. An inner line of the first and/or of the second heat exchanger then preferably forms a portion of the gas line. The thermal fluid for cooling or heating the heat exchanger, on the other hand, preferably flows through an annular gap delimited by an outer line and the inner line.

A longitudinal axis of a first pipe of the first and/or of the second heat exchanger can extend at an angle of from 1 to 10° relative to a longitudinal axis of a second pipe of the first and/or of the second heat exchanger. The non-parallel arrangement of the two pipes facilitates the gravity-driven discharge of condensation water when the gas dehumidifier is installed in a moving transport means, and in particular in an aircraft moving in three dimensions.

A transport means comprises a cooling and gas dehumidifying system described above. The transport means is, in particular, in the form of an aircraft.

In a method for operating a cooling and gas dehumidifying system, a thermal fluid is guided through a cooling circuit. The thermal fluid flowing through the cooling circuit is cooled in a cooling arrangement arranged in the cooling circuit. The thermal fluid flowing through the cooling circuit is thermally coupled with a consumer which gives up heat energy to the thermal fluid flowing through the cooling circuit. A gas flow is dehumidified by means of a gas dehumidifier, wherein a heat exchanger arrangement of the gas dehumidifier is thermally coupled in a gas dehumidifying operating state with the thermal fluid flowing through the cooling circuit downstream of the cooling arrangement and having a first temperature and thereby gives up heat energy to the thermal fluid. In a de-icing operating state, the heat exchanger arrangement is thermally coupled with the thermal fluid flowing through the cooling circuit downstream of the consumer and having a second temperature and thereby absorbs thermal energy from the thermal fluid. The second temperature is higher than the first temperature.

BRIEF DESCRIPTION OF THE DRAWINGS

Exemplary embodiments of the invention will be described in greater detail hereinbelow with reference to the accompanying schematic drawings, in which FIG. 8 is a front view of a heat exchanger arrangement suitable for use in a gas dehumidifier according to FIGS. 3 to 4, FIG. 9 is a side view of the heat exchanger arrangement according to FIG. 8 in the state connected to a water collector, FIG. 10 is a view of the heat exchanger arrangement according to FIG. 9 without an outer line.

DETAILED DESCRIPTION OF THE PREFERRED EMBODIMENTS

Figure 1:
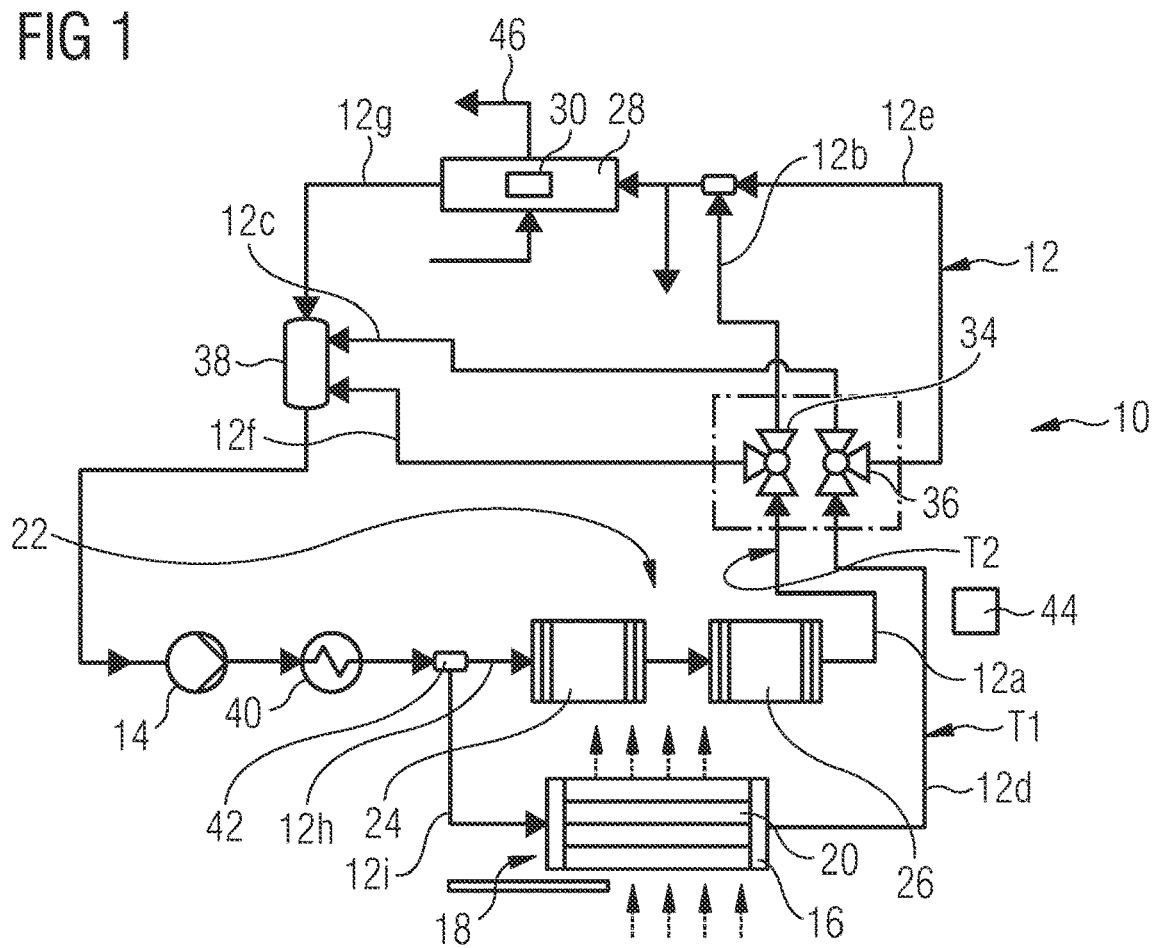
FIG. 1 shows a cooling and dehumidifying system.
Figure 12:
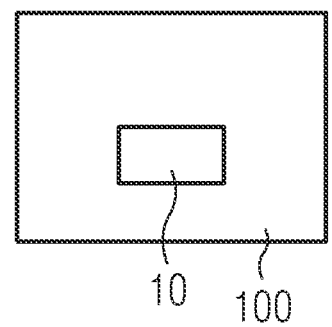
FIG. 12 is a schematic view of a transport means equipped with the cooling and gas dehumidifying system according to FIG. 1.

FIG. 1 shows a cooling and gas dehumidifying system 10 which is suitable for use in a transport means 100 shown schematically in FIG. 12. The cooling and gas dehumidifying system 10 comprises a cooling circuit 12 in which a thermal fluid, for example an ethylene glycol-water mixture or a propylene glycol-water mixture, is circulated. For conveying the thermal fluid through the cooling circuit 12, a conveying device 14 in the form of a pump is arranged in the cooling circuit 12.

In the cooling circuit 12 there is arranged a cooling arrangement 16 which is adapted to cool the thermal fluid flowing through the cooling circuit 12. In the variant shown in FIG. 1, the cooling arrangement 16 comprises a heat exchanger 20 arranged in a ram air channel 18. Thermal fluid guided through the heat exchanger 20 is consequently thermally coupled as it flows through the heat exchanger 20 with the cold external air flowing through the ram air channel 18, and is thereby cooled to a temperature of about −15° C.

There is further arranged in the cooling circuit 12 a consumer 22 which gives up heat energy to the thermal fluid flowing through the cooling circuit 12. The consumer 22 comprises a fuel cell 24 and an electrolyzer 26. During operation, hydrogen and oxygen are fed to the fuel cell 24. The fuel cell 24 converts those gases into water and thereby generates electrical energy. The electrolyzer 26 electrolytically decomposes the water produced by the fuel cell 24 into the gases hydrogen and oxygen again. Before these gases can be circulated to the fuel cell 24 again, they must be dehumidified, whereby the fuel cell 24 can operate more efficiently, the drier the gases that are fed thereto.

Therefore, the cooling and gas dehumidifying system 10 further comprises a gas dehumidifier 28 which in turn is equipped with a heat exchanger arrangement 30 shown only schematically in FIG. 1. During operation of the cooling and gas dehumidifying system 10, the heat exchanger arrangement 30 is alternately in a gas dehumidifying operating state and a de-icing operating state. In its gas dehumidifying operating state, the heat exchanger arrangement 30 is thermally coupled with the thermal fluid flowing through the cooling circuit 12 downstream of the cooling arrangement 16 and having a first temperature T1 and thereby gives up heat energy to the thermal fluid. In its de-icing operating state, the hydrogen and/or oxygen to be fed to the fuel cell 24 further flows through the heat exchanger arrangement 30 of the gas dehumidifier 28. The gas to be dehumidified is guided through the gas dehumidifier 28 via a gas line 46.

As it flows through the heat exchanger arrangement 30 of the gas dehumidifier 28, the gas to be dehumidified is cooled to below the dew point of water, so that the water contained in the gas can be deposited as condensation water. The heat given off in this process by the gas to be dehumidified is transmitted to the thermal fluid circulating in the cooling circuit 12. Since the heat exchanger arrangement 30 is fed with the thermal fluid leaving the cooling arrangement 16 with a first temperature T1 of about −15° C., particularly efficient drying of the gas to be fed to the fuel cell 24 is possible in the gas dehumidifier 28. However, cooling of the gas flowing through the heat exchanger arrangement 30 to a temperature below the freezing point of water leads to icing up of the heat exchanger arrangement 30.

For this reason, the heat exchanger arrangement 30 of the gas dehumidifier 28 is further adapted to be thermally coupled in a de-icing operating state with the thermal fluid flowing through the cooling circuit 12 downstream of the consumer 22 and having a second temperature T2, and thereby to absorb heat energy from the thermal fluid. The second temperature T2 is higher than the first temperature and here is about +80° C. In other words, in its de-icing operating state, the heat exchanger arrangement 30 of the gas dehumidifier 28 is heated by the thermal fluid circulating in the cooling circuit 12 and thereby de-iced.

In order thermally to couple the heat exchanger arrangement 30 of the gas dehumidifier 28 with thermal fluid flowing through different portions of the cooling circuit 12, depending on its operating state, the cooling and gas dehumidifying system 10 comprises a first control valve 34 and a second control valve 36. In FIG. 1, the first and the second control valve 34, 36 are shown as two separately configured structural units. It is, however, also possible to integrate the functions, described in greater detail hereinbelow, of the first and of the second control valve 34, 36 in a single valve arrangement.

The first control valve 34 is adapted to feed the thermal fluid which is flowing through the cooling circuit 12 downstream of the consumer 22 and which is consequently warm either to the heat exchanger arrangement 30 of the gas dehumidifier 28 or to a storage container 38. In particular, the first control valve 34 connects a first portion 12a of the cooling circuit 12 extending downstream of the consumer 22 to a second portion 12b of the cooling circuit 12 leading in the direction towards the heat exchanger arrangement 30 when the heat exchanger arrangement 30 is in its de-icing operating state and is to be heated by the warm thermal fluid flowing through the cooling circuit 12 downstream of the consumer 22. When the heat exchanger arrangement 30 of the gas dehumidifier 28 is in its gas dehumidifying operating state, on the other hand, the first control valve 34 serves to separate the first portion 12a of the cooling circuit 12 from the second portion 12b of the cooling circuit 12 and instead connects the first portion 12a of the cooling circuit 12 to a third portion 12c of the cooling circuit 12 leading in the direction towards the storage container 38.

The second control valve 36 is adapted to feed the thermal fluid which is flowing through the cooling circuit 12 downstream of the cooling arrangement 16 and which is consequently cold either to the heat exchanger arrangement 30 of the gas dehumidifier 28 or to the storage container 38. In particular, the second control valve 36 connects a fourth portion 12d of the cooling circuit 12 extending downstream of the cooling arrangement 16 to a fifth portion 12e of the cooling circuit 12 leading in the direction towards the heat exchanger arrangement 30 of the gas dehumidifier 28 when the heat exchanger arrangement 30 is in its gas dehumidifying operating state and is to be cooled by the cold thermal fluid flowing through the cooling circuit 12 downstream of the cooling arrangement 16. When the heat exchanger arrangement 30 is in its de-icing operating state, on the other hand, the second control valve 36 serves to separate the fourth portion 12d of the cooling circuit 12 from the fifth portion 12e of the cooling circuit 12 and instead connects the fourth portion 12d of the cooling circuit 12 to a sixth portion 12f of the cooling circuit 12 leading in the direction towards the storage container 38.

In the exemplary embodiment illustrated in FIG. 1 of a cooling and gas dehumidifying system 10, both the third portion 12c and the sixth portion 12f of the cooling circuit 12 lead into the storage container 38. Consequently, the thermal fluid heated by heat transfer from the consumer 22 is mixed in the storage container 38 with the thermal fluid cooled by the cooling arrangement 16. Furthermore, the storage container 38 is arranged in the cooling circuit 12 downstream of the heat exchanger arrangement 30 of the gas dehumidifier 28 and connected to a seventh portion 12g of the cooling circuit 12 extending downstream of the heat exchanger arrangement 30, so that thermal fluid which in the gas dehumidifying operating state of the heat exchanger arrangement 30 absorbs heat from the gas to be dehumidified and is thereby heated is likewise guided into the storage container 38.

A heating device 40 is further arranged in the cooling circuit 12 upstream of the consumer 22, which heating device heats the thermal fluid flowing through the cooling circuit 12, if required, before it is thermally coupled with the consumer 22. In particular, the heating device 40 heats the thermal fluid flowing through the cooling circuit 12 to a temperature of about 75° C. before it is thermally coupled with the consumer 22.

The cooling circuit 12 further comprises a first circuit branch 12h which is thermally coupled with the consumer 22. The cooling circuit 12 further comprises a second circuit branch 12i which runs parallel to the first circuit branch 12h and is thermally coupled with the cooling arrangement 16. Accordingly, a branching point is provided in the cooling circuit 12 upstream of the consumer 22 and of the cooling arrangement 16, at which branching point the cooling circuit 12 branches into the first and the second circuit branch 12h, 12i.

In the region of this branching point there is arranged in the cooling circuit 12 a flow control device 42 which is adapted to guide a first partial volume flow of the thermal fluid flowing through the cooling circuit 12 into the first circuit branch 12h and a second partial volume flow of the thermal fluid flowing through the cooling circuit 12 into the second circuit branch 12i. The flow control device 42 comprises a hydraulic resistor which serves to correspondingly divide the thermal fluid flowing through the cooling circuit 12 into the first partial volume flow and the second partial volume flow, wherein the first partial volume flow is larger than the second partial volume flow. Accordingly, a larger volume flow of the thermal fluid is fed to the consumer 22 by means of the flow control device 42 than is fed to the cooling arrangement 16.

Operation of the cooling and gas dehumidifying system, and, in particular, the change in operating state of the heat exchanger arrangement 30 of the gas dehumidifier 28, are controlled by means of a control unit 44. In particular, the control unit 44 controls the first and the second control valve 34, 36 in order to switch the heat exchanger arrangement 30 between its gas dehumidifying operating state and its de-icing operating state.

For example, the heat exchanger arrangement 30 is switched from its gas dehumidifying operating state into its de-icing operating state when a pressure loss in a gas flow for dehumidification flowing through the heat exchanger arrangement 30 exceeds a threshold value. Furthermore, the heat exchanger arrangement 30 can be changed into the de-icing operating state when a temperature of the gas flow for dehumidification flowing through the heat exchanger arrangement 30 exceeds a threshold value on leaving the heat exchanger arrangement 30. In addition or alternatively, it is conceivable that the heat exchanger arrangement 30 is switched from its gas dehumidifying operating state into its de-icing operating state when a moisture content of the gas flow for dehumidification flowing through the heat exchanger arrangement 30 exceeds a threshold value on leaving the heat exchanger arrangement 30.

In addition or alternatively, the heat exchanger arrangement 30 can be changed into its de-icing operating state when a mass or volume flow of the gas flow for dehumidification flowing through the heat exchanger arrangement 30 is below a threshold value on leaving the heat exchanger arrangement 30. A further parameter which can be used for controlling the operating state of the heat exchanger arrangement 30 is the elapse of a time period.

The control unit 44 can use only one of these parameters for controlling the operating state of the heat exchanger arrangement 30. Alternatively, however, parameter combinations can also be used to cause the heat exchanger arrangement 30 to initiate a change in its operating state. For one or more of the above-mentioned parameters, corresponding curves can be stored in a memory of the control unit 44, which curves provide information about the icing up of the flow channels in the heat exchanger arrangement 30.

Figure 2:
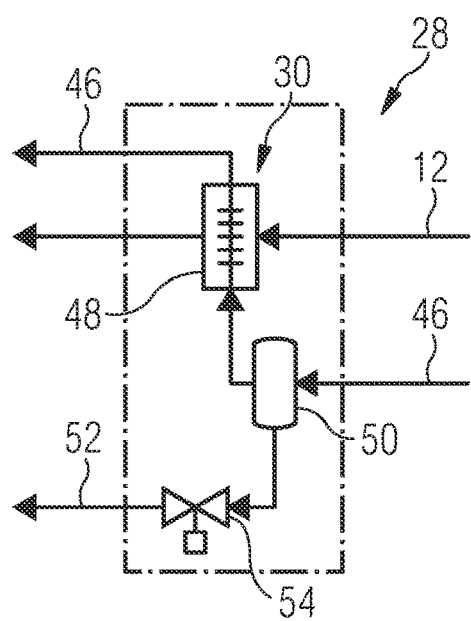
FIG. 2 shows a first variant of a gas dehumidifier suitable for use in the cooling and gas dehumidifying system according to FIG. 1.

In FIG. 2, a first variant of a gas dehumidifier 28 suitable for use in the cooling and gas dehumidifying system 10 is illustrated in greater detail. The gas dehumidifier 28 shown in FIG. 2 comprises a gas line 46 through which the gas to be dehumidified in the gas dehumidifier 28 flows. A first heat exchanger 48 is arranged in the gas line, that is to say in the variant of the gas dehumidifier 28 shown in FIG. 2, the heat exchanger arrangement 30 comprises only one heat exchanger.

In its gas dehumidifying operating state, the first heat exchanger 48 is thermally coupled with the thermal fluid flowing through the cooling circuit 12 downstream of the cooling arrangement 16 and having the first temperature T1, so that the gas in the gas line 46 is cooled as it flows through the first heat exchanger 48 and thereby dried. In its de-icing operating state, on the other hand, the first heat exchanger 48 is thermally coupled with the thermal fluid flowing through the cooling circuit 12 downstream of the consumer 22 and having the second temperature T2. The gas in the gas line 46 is then not cooled as it flows through the first heat exchanger 48 and also not dried.

The gas dehumidifier 28 further comprises a water collector 50 arranged in the gas line 46, which water collector is adapted to receive water coming from the first heat exchanger 48. The water collector 50 and the first heat exchanger 48 are so arranged relative to one another that the water coming from the first heat exchanger 48 flows into the water collector 50 by gravity. A thermal coupling, not illustrated in greater detail in FIG. 2, between the water collector 50 and the thermal fluid flowing through the cooling circuit 12 downstream of the consumer 22 and having the second temperature T2 is further provided. The water collector 50 can thus be heated and is thus protected against icing up.

A water outlet line 52 is connected to the water collector 50. In the water outlet line 52 there is arranged a third control valve 54 which is adapted to control the discharge of water from the water collector 50. In particular, the third control valve 54, under the control of the control unit 44, frees the water outlet line 52 when a water level in the water collector 50 exceeds a first threshold value. By contrast, the third control valve 54, under the control of the control unit 44, shuts off the water outlet line 52 again before the water level in the water collector 50 falls below a second threshold value, wherein the second threshold value is smaller than the first threshold value. When the third control valve 54 is operated in this way, a residual amount of water always remains in the water collector 50.

Figure 3:
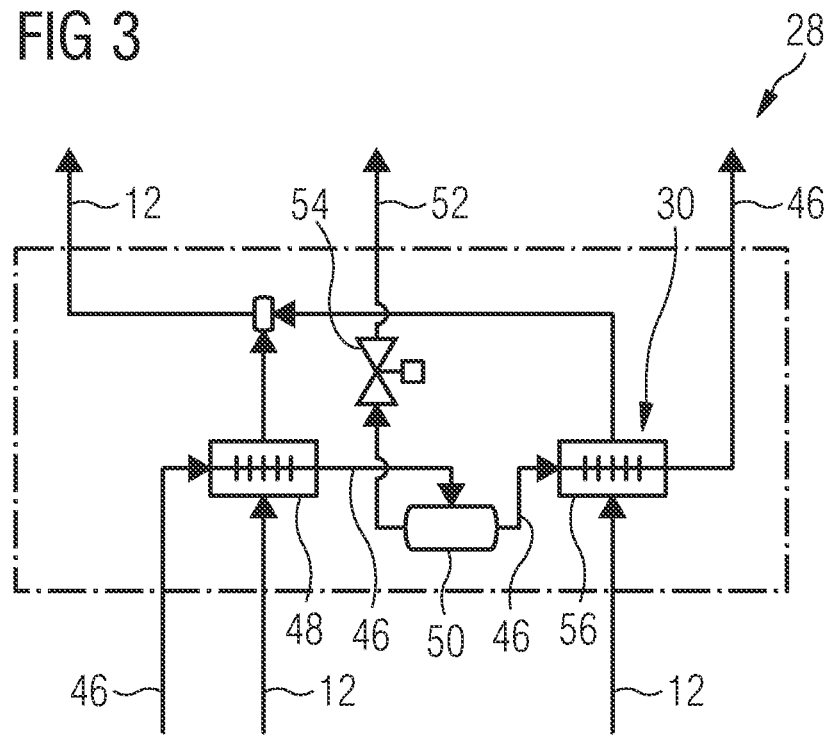
FIG. 3 shows a second variant of a gas dehumidifier suitable for use in the cooling and gas dehumidifying system according to FIG. 1.

The variant of the gas dehumidifier 28 shown in FIG. 3 differs from the gas dehumidifier 28 according to FIG. 2 in that it comprises a second heat exchanger 56. The first and the second heat exchanger 48, 56 of the gas dehumidifier 28 are arranged one behind the other in the gas line 46 of the gas dehumidifier 28 and are adapted to be switched, under the control of the control unit 44, alternately between their de-icing operating state and their gas dehumidifying operating state. Accordingly, the first heat exchanger 48 is thermally coupled with the thermal fluid flowing through the cooling circuit 12 downstream of the cooling arrangement 16 and having the first temperature T1, while the second heat exchanger 56 is thermally coupled with the thermal fluid flowing through the cooling circuit 12 downstream of the consumer 22 and having the second temperature T2, and is thereby de-iced. Conversely, the second heat exchanger 56 is thermally coupled with the thermal fluid flowing through the cooling circuit 12 downstream of the cooling arrangement 16 and having the first temperature T1, while the first heat exchanger 48 is thermally coupled with the thermal fluid flowing through the cooling circuit 12 downstream of the consumer 22 and having the second temperature T2, and is thereby de-iced. Continuous operation of the gas dehumidifier 28 is thereby made possible.

The gas dehumidifier 28 shown in FIG. 3 is equipped with only one water collector 50 which receives water from the first and the second heat exchanger 48, 56. The arrangement of the water collector 50 relative to the two heat exchangers 48, 56 is so chosen that the water from the first and the second heat exchanger 48, 56 flows into the water collector 50 by gravity.

In the gas dehumidifier 28 according to FIG. 3, the water collector 50 is arranged in the gas line 46 of the gas dehumidifier 28 between the first and the second heat exchanger 48, 56. The gas to be dehumidified in the gas dehumidifier 28 therefore flows in succession through the first heat exchanger 48, the water collector 50 and the second heat exchanger 56. When the first heat exchanger 48 is in its de-icing operating state, although the gas to be dried is first guided through the first heat exchanger 48, it is not dried thereby. The gas is cooled and consequently dried only when it flows through the second heat exchanger 56, which is in its gas dehumidifying operating state. By contrast, the gas to be dried is already dried in the first heat exchanger 48 when that heat exchanger is in its gas dehumidifying operating state. When the second heat exchanger 56 is then in its de-icing operating state, the gas absorbs some moisture again as it flows through the second heat exchanger 56. However, because the dwell time of the gas in the second heat exchanger 56 is short, the drying quality is not unduly impaired.

Otherwise, the structure and the functioning of the gas dehumidifier 28 according to FIG. 3 correspond to the structure and the functioning of the gas dehumidifier 28 shown in FIG. 2.

Figure 4:
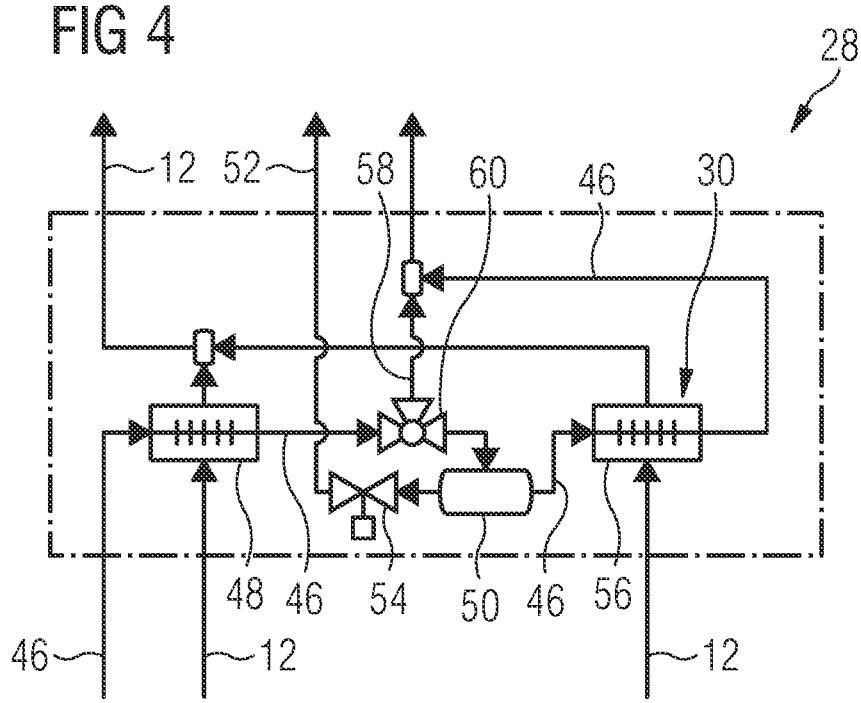
FIG. 4 shows a third variant of a gas dehumidifier suitable for use in the cooling and gas dehumidifying system according to FIG. 1.

The gas dehumidifier 28 shown in FIG. 4 differs from the gas dehumidifier 28 according to FIG. 3 in that the gas dehumidifier 28 further comprises a bypass line 58 which branches from the gas line 46 between the first and the second heat exchanger 48, 56 and is connected to an outlet of the gas line 46. In particular, the bypass line 58 branches from the gas line 46 between the first heat exchanger 48 and the water collector 50. A fourth control valve 60, controlled by the control unit 44, serves to guide a gas flow flowing through the gas line 46, after it has flowed through the first heat exchanger 48, into the bypass line 58 when the first heat exchanger 48 is in its gas dehumidifying operating state. Gas dried in the first heat exchanger 48, after it has flowed through the first heat exchanger 48, can then be fed directly to the outlet of the gas line 46 without the gas absorbing moisture again as it flows through the second heat exchanger 56 in its de-icing operating state.

By contrast, the fourth control valve 60 guides the gas flow flowing through the gas line 46, after it has flowed through the first heat exchanger 48, into the second heat exchanger 56 when the first heat exchanger 48 is in its de-icing operating state. The gas flowing through the gas line 46 is then dried as it flows through the second heat exchanger 56 in its gas dehumidifying operating state. The gas dehumidifier 28 shown in FIG. 4 delivers a particularly high drying quality.

Otherwise, the structure and the functioning of the gas dehumidifier 28 according to FIG. 4 correspond to the structure and the functioning of the gas dehumidifier 28 shown in FIG. 3.

Figure 5:
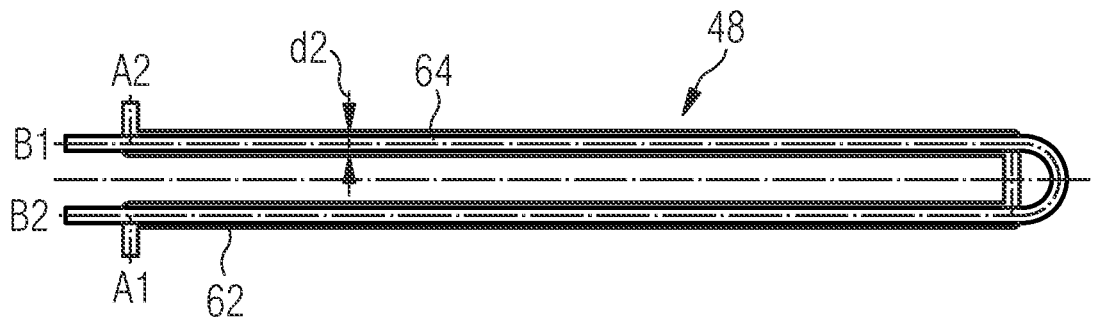
FIG. 5 is a sectional view of a heat exchanger suitable for use in a gas dehumidifier according to FIGS. 2 to 4.

FIG. 5 shows a first heat exchanger 48 in the form of a double-pipe heat exchanger. The second heat exchanger 56 can be configured in the same way. The double-pipe heat exchanger 48 according to FIG. 5 comprises an outer line 62 which surrounds an inner line 64. The thermal fluid from the cooling circuit 12, which is guided through the heat exchanger 48 for cooling or heating the heat exchanger 48, flows through the outer line 62, or an annular gap delimited by the outer line 62 and the inner line 64, from an inlet B1 to an outlet B2. The gas to be dried flows through the inner line 64, on the other hand, from an inlet A1 to an outlet A2.

Figure 6:
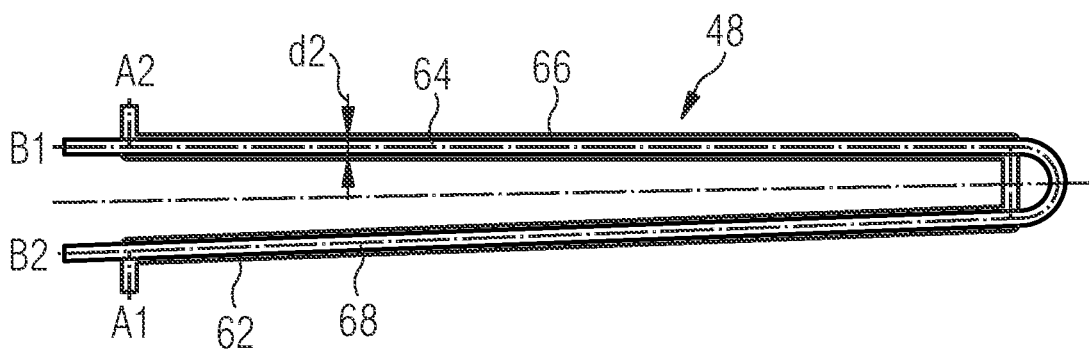
FIG. 6 is a sectional view of a further heat exchanger suitable for use in a gas dehumidifier according to FIGS. 2 to 4.

The variant of a heat exchanger 48 shown in FIG. 6 differs from the heat exchanger 48 shown in FIG. 5 in that a longitudinal axis of a first pipe 66 of the heat exchanger 48 extends at an angle of from 1 to 10° relative to a longitudinal axis of a second pipe 68 of the heat exchanger 48. The condensation water flows out in the region of the outlet B2 of the inner line 62. The non-parallel arrangement of the two pipes 66, 68 facilitates the gravity-driven discharge of the condensation water when the gas dehumidifier 28 is installed in an aircraft 100 moving in three dimensions according to FIG. 12 and the aircraft 100 in the representation according to FIG. 6 is flying from left to right or from right to left.

Figure 7:
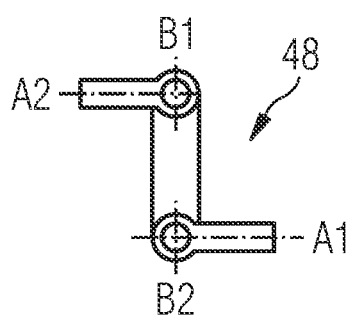
FIG. 7 is a front view of a further heat exchanger suitable for use in a gas dehumidifier according to FIGS. 2 to 4.
Figure 11:
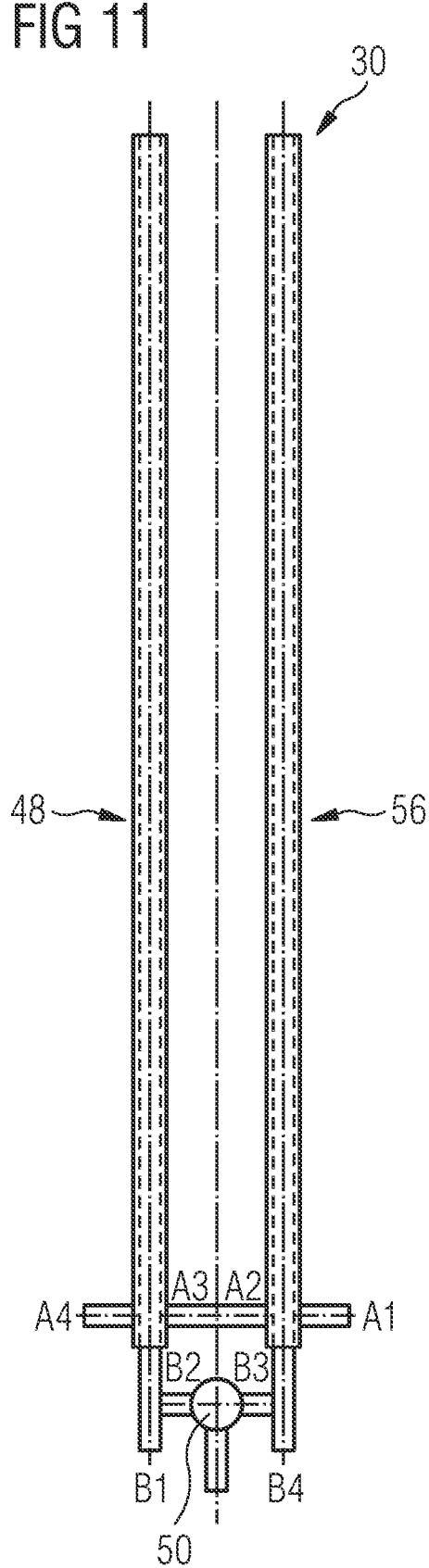
FIG. 11 is a plan view of the heat exchanger arrangement according to FIG. 9.

The variant of a heat exchanger 48 shown in FIG. 7 comprises an inlet A2 which is arranged offset relative to the inlet A1.

FIGS. 8 to 11 show a heat exchanger arrangement 30 comprising a first and a second heat exchanger 48, 56. The first and the second heat exchanger 48, 56 are connected in series, and the thermal fluid from the cooling circuit 12 and the gas to be dried flow through them according to the counterflow principle. In the region of an inlet B1, the gas to be dried enters the inner line of the first heat exchanger 48. In the region of an outlet B2, the gas to be dried is guided out of the inner line of the first heat exchanger 48 and flows into the water collector 50. At a point B3, the gas leaves the water collector 50 and flows into an inner line of the second heat exchanger 56. Finally, the gas leaves the inner line of the second heat exchanger 56 in the region of an outlet B4.

The thermal fluid flows in each case through the annular gap which is formed between an outer line and an inner line of the two heat exchangers 48, 56. The thermal fluid enters the second heat exchanger 56 in the region of an inlet A1 and leaves the second heat exchanger 56 in the region of an outlet A2. In the region of an inlet A3, the thermal fluid enters the first heat exchanger 48. Finally, the thermal fluid leaves the first heat exchanger 48 in the region of an outlet A4. The outer lines of the two heat exchangers 48, 56 are coupled together in the region of the outlet A2 and the inlet A3 and are not connected to the water collector 50. Alternatively, it would also be possible to guide the gas to be dried through the annular gap which is present between the inner line and the outer line of the two heat exchangers 48, 56 when the thermal fluid is guided in each case through the inner lines of the heat exchangers 48, 56.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A cooling and gas dehumidifying system, comprising:
a cooling circuit in which a thermal fluid is circulated,
a cooling arrangement which is arranged in the cooling circuit and configured to cool the thermal fluid flowing through the cooling circuit,
a consumer which is configured to release heat energy to the thermal fluid flowing through the cooling circuit, and
a gas dehumidifier having a heat exchanger arrangement,
wherein the heat exchanger arrangement is configured to be thermally coupled in a gas dehumidifying operating state with the thermal fluid flowing through the cooling circuit downstream of the cooling arrangement and having a first temperature, and thereby give up heat energy to the thermal fluid, and to be thermally coupled in a de-icing operating state with the thermal fluid flowing through the cooling circuit downstream of the consumer and having a second temperature, and thereby absorb heat energy from the thermal fluid, wherein the second temperature is higher than the first temperature,
wherein a heating device is arranged in the cooling circuit upstream of the consumer, the heating device being configured to heat the thermal fluid flowing through the cooling circuit before the thermal fluid is thermally coupled with the consumer.

2. The cooling and gas dehumidifying system according to claim 1,
which further comprises at least one of:
a first control valve which is configured to feed the thermal fluid flowing through the cooling circuit downstream of the consumer to at least one of the heat exchanger arrangement of the gas dehumidifier or to a storage container, or
a second control valve which is configured to feed the thermal fluid flowing through the cooling circuit downstream of the cooling arrangement to at least one of the heat exchanger arrangement of the gas dehumidifier or to the storage container.

3. The cooling and gas dehumidifying system according to claim 2,
wherein at least of
the first and the second control valve are configured to feed the thermal fluid flowing through the cooling circuit downstream of the consumer and the thermal fluid flowing through the cooling circuit downstream of the cooling arrangement to the same storage container, or
the storage container is arranged in the cooling circuit downstream of the heat exchanger arrangement of the gas dehumidifier.

4. The cooling and gas dehumidifying system according to claim 1, wherein the cooling circuit comprises a first circuit branch which is thermally coupled with the consumer and a second circuit branch which runs parallel to the first circuit branch and is thermally coupled with the cooling arrangement.

5. A cooling and gas dehumidifying system, comprising:
a cooling circuit in which a thermal fluid is circulated,
a cooling arrangement which is arranged in the cooling circuit and configured to cool the thermal fluid flowing through the cooling circuit,
a consumer which is configured to release heat energy to the thermal fluid flowing through the cooling circuit, and
a gas dehumidifier having a heat exchanger arrangement,
wherein the heat exchanger arrangement is configured to be thermally coupled in a gas dehumidifying operating state with the thermal fluid flowing through the cooling circuit downstream of the cooling arrangement and having a first temperature, and thereby give up heat energy to the thermal fluid, and to be thermally coupled in a de-icing operating state with the thermal fluid flowing through the cooling circuit downstream of the consumer and having a second temperature, and thereby absorb heat energy from the thermal fluid, wherein the second temperature is higher than the first temperature,
wherein the cooling circuit comprises a first circuit branch which is thermally coupled with the consumer and a second circuit branch which runs parallel to the first circuit branch and is thermally coupled with the cooling arrangement,
further comprising a flow control device configured to guide a first partial volume flow of the thermal fluid flowing through the cooling circuit into the first circuit branch and a second partial volume flow of the thermal fluid flowing through the cooling circuit into the second circuit branch, wherein the first partial volume flow is larger than the second partial volume flow.

6. The cooling and gas dehumidifying system according to claim 1, wherein the heat exchanger arrangement of the gas dehumidifier is configured to change from the gas dehumidifying operating state into the de-icing operating state when at least one of:
a pressure loss in a gas flow for dehumidification flowing through the heat exchanger arrangement exceeds a threshold value,
a temperature of the gas flow for dehumidification flowing through the heat exchanger arrangement exceeds a threshold value on leaving the heat exchanger arrangement,
a moisture content of the gas flow for dehumidification flowing through the heat exchanger arrangement exceeds a threshold value on leaving the heat exchanger arrangement,
a mass or volume flow of the gas flow for dehumidification flowing through the heat exchanger arrangement is below a threshold value on leaving the heat exchanger arrangement, or
a time period has elapsed.

7. A cooling and gas dehumidifying system, comprising:
a cooling circuit in which a thermal fluid is circulated,
a cooling arrangement which is arranged in the cooling circuit and configured to cool the thermal fluid flowing through the cooling circuit,
a consumer which is configured to release heat energy to the thermal fluid flowing through the cooling circuit, and
a gas dehumidifier having a heat exchanger arrangement, wherein the heat exchanger arrangement is configured to be thermally coupled in a gas dehumidifying operating state with the thermal fluid flowing through the cooling circuit downstream of the cooling arrangement and having a first temperature, and thereby give up heat energy to the thermal fluid, and to be thermally coupled in a de-icing operating state with the thermal fluid flowing through the cooling circuit downstream of the consumer and having a second temperature, and thereby absorb heat energy from the thermal fluid, wherein the second temperature is higher than the first temperature, wherein the gas dehumidifier comprises:

a gas line through which gas to be dehumidified in the gas dehumidifier can flow, a first heat exchanger of the heat exchanger arrangement, arranged in the gas line, a water collector arranged in the gas line, the water collector being configured to receive water coming from the first heat exchanger, further, wherein at least one of:

the water collector and the first heat exchanger are so arranged relative to one another that the water coming from the first heat exchanger flows into the water collector by gravity, or the water collector is thermally coupled with the thermal fluid flowing through cooling circuit downstream of the consumer and having the second temperature.

8. The cooling and gas dehumidifying system according to claim 7, wherein the gas dehumidifier further comprises:
a water outlet line connected to the water collector, and
a third control valve arranged in the water outlet line, which valve is configured to control the discharge of water from the water collector,
wherein the third control valve is configured to free the water outlet line when a water level in the water collector exceeds a first threshold value and to shut off the water outlet line again before the water level in the water collector falls below a second threshold value, wherein the second threshold value is smaller than the first threshold value.

9. The cooling and gas dehumidifying system according to claim 7, wherein at least one of
the gas dehumidifier further comprises a second heat exchanger of the heat exchanger arrangement,
the first and the second heat exchanger are configured to be switched alternately between the de-icing operating state and the gas dehumidifying operating state, or
the first and the second heat exchanger are arranged one behind the other in the gas line of the gas dehumidifier.

10. The cooling and gas dehumidifying system according to claim 9, wherein at least one of:
the water collector is configured to receive water coming from the second heat exchanger, wherein the water collector and the second heat exchanger are so arranged relative to one another that the water coming from the second heat exchanger flows into the water collector by gravity, or the water collector is arranged in the gas line of the gas dehumidifier between the first and the second heat exchanger.

11. The cooling and gas dehumidifying system according to claim 9, wherein the gas dehumidifier further comprises:
a bypass gas line which branches from the gas line between the first and the second heat exchanger,
a fourth control valve which is configured to guide a gas flow flowing through the gas line into the bypass line when the first heat exchanger is in the gas dehumidifying operating state and to guide the gas flow flowing through the gas line into the second heat exchanger when the first heat exchanger is in the de-icing operating state.

12. The cooling and gas dehumidifying system according to claim 7, wherein at least one of:
at least one of the first or the second heat exchanger of the heat exchanger arrangement comprises a double-pipe heat exchanger, or
a longitudinal axis of a first pipe of at least one of the first or the second heat exchanger extends at an angle of from 1 to 10° relative to a longitudinal axis of a second pipe of the at least one of the first or the second heat exchanger.

13. A transport means which comprises the cooling and gas dehumidifying system according to claim 1.

14. A method for operating a cooling and gas dehumidifying system, which comprises the steps:
guiding a thermal fluid through a cooling circuit,
cooling the thermal fluid flowing through the cooling circuit in a cooling arrangement arranged in the cooling circuit,
thermally coupling the thermal fluid flowing through the cooling circuit with a consumer which gives up heat energy to the thermal fluid flowing through the cooling circuit,
dehumidifying a gas flow by means of a gas dehumidifier, wherein a heat exchanger arrangement of the gas dehumidifier is thermally coupled in a gas dehumidifying operating state with the thermal fluid flowing through the cooling circuit downstream of the cooling arrangement and having a first temperature and thereby gives up heat energy to the thermal fluid, and is thermally coupled in a de-icing operating state with the thermal fluid flowing through the cooling circuit downstream of the consumer and having a second temperature and thereby absorbs heat energy from the thermal fluid, wherein the second temperature is higher than the first temperature,
wherein a heating device is arranged in the cooling circuit upstream of the consumer, the heating device being configured to heat the thermal fluid flowing through the cooling circuit before the thermal fluid is thermally coupled with the consumer.

\* \* \* \* \*